United States Patent
Robinson et al.

[15] 3,691,269
[45] Sept. 12, 1972

[54] METHOD OF PREPARING A CONTAINER

[72] Inventors: Keith D. Robinson, Mogadore, Ohio 44260; James D. Tremelin, Akron, Ohio 44313

[73] Assignee: Goodyear Tire and Rubber Company, Akron, Ohio

[22] Filed: Aug. 7, 1969

[21] Appl. No.: 849,294

Related U.S. Application Data

[63] Continuation of Ser. No. 644,218, June 7, 1967, abandoned.

[52] U.S. Cl. ............... 264/255, 264/257, 264/264, 264/309
[51] Int. Cl. ......................... B29c 13/04, B29h 9/02
[58] Field of Search........264/257, 79, 255, 264, 337, 264/338, 308, 309

[56] References Cited

UNITED STATES PATENTS

| | | |
|---|---|---|
| 2,241,385 | 5/1941 | Beal..........................264/96 |
| 2,296,513 | 9/1942 | Gavatin................264/309 X |
| 2,789,933 | 4/1957 | Bargmeyer.............264/309 X |
| 3,009,209 | 11/1961 | Weinbrenner.........264/309 X |
| 3,058,165 | 10/1962 | Purvis....................264/257 X |
| 3,105,062 | 9/1963 | Graham.................264/309 X |
| 3,163,689 | 12/1964 | Ives........................264/257 X |
| 3,201,136 | 8/1965 | Harrison....................277/198 |
| 3,250,538 | 5/1966 | Albon..........................277/24 |
| 3,324,220 | 6/1967 | Goy......................264/257 X |

Primary Examiner—Robert F. White
Assistant Examiner—Allen M. Sokal
Attorney—F. W. Brunner and H. C. Young

[57] ABSTRACT

A method of preparing a container having at least two compartments therein by the sequential and alternate deposition of layers of release agents and flexible polymeric materials over at least a portion of a convex or concave surface of a building form.

3 Claims, 4 Drawing Figures

PATENTED SEP 12 1972   3,691,269

INVENTORS
KEITH D. ROBINSON
JAMES D. TREMELIN
BY *H. C. Young Jr.*
ATTORNEY

METHOD OF PREPARING A CONTAINER

This is a continuation of application Ser. No. 644,218, filed June 7, 1967, now abandoned.

This invention relates to a method of constructing various articles wherein at least a part of the article serves as a building form for building another part thereof and to the constructed article. More particularly, this invention relates to a method of preparing a container having at least two compartments from flexible polymeric materials.

Containers having multiple compartments can be prepared by depositing flexible polymeric thermoplastic and rubbery materials onto the surfaces of mold structure having separate molds therein for each compartment. Thus, the containers are prepared in specially constructed multiple compartment molds. In one particular aspect, multiple compartment containers having a means for expelling their contents such as expeller tanks having diaphragms integrally positioned therein can be prepared from flexible plastic and rubbery materials. However, difficulty is experienced in the shaping and obtaining closures of such containers even when specially constructed multiple compartment molds are used.

Therefore, it is an object of this invention to provide a novel and improved method of preparing containers having at least two compartments. It is a further object of this invention to provide a method of preparing a container having an integral diaphragm therein.

These and other objects of this invention and advantages thereof will be apparent in view of the following detailed description and drawings.

Figure 1:
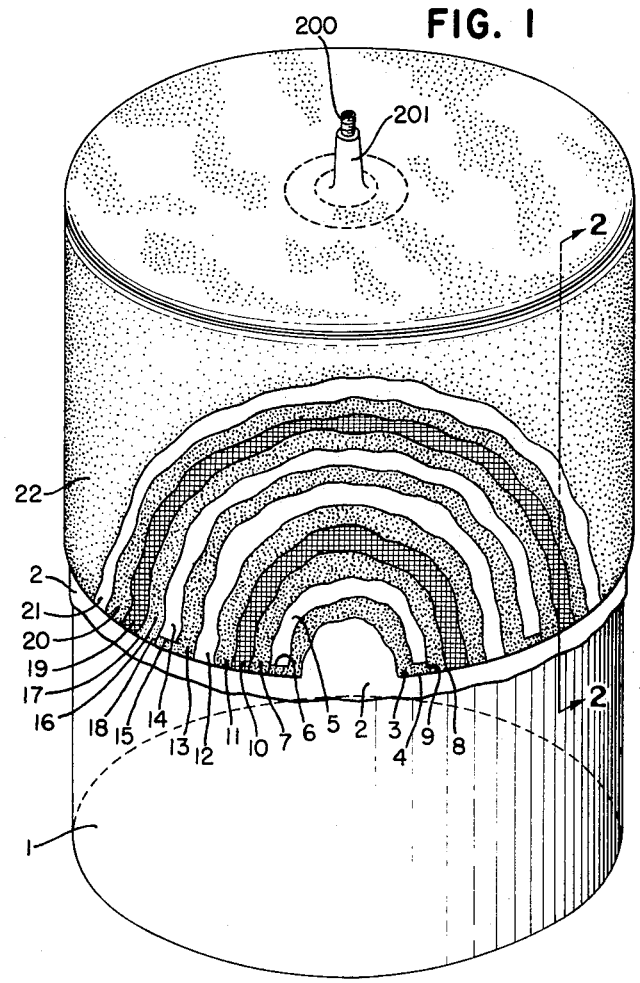
FIG. 1 is a perspective view of a building form and the various coatings and layers of a flexible polymeric material such as a polyurethane deposited thereon to build a pinched seam-type container having at least two compartments such as an expeller container having an integral diaphragm therein shown more clearly by the cutaway portion.
Figure 2:
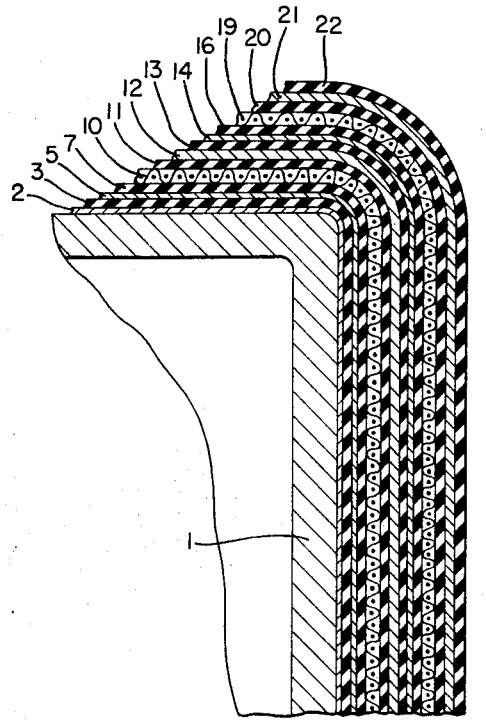
FIG. 2 is an enlarged cross-sectional view along line 2—2 of FIG. 1 where the finished container is of the pinch-seam type. temperature
Figure 3:
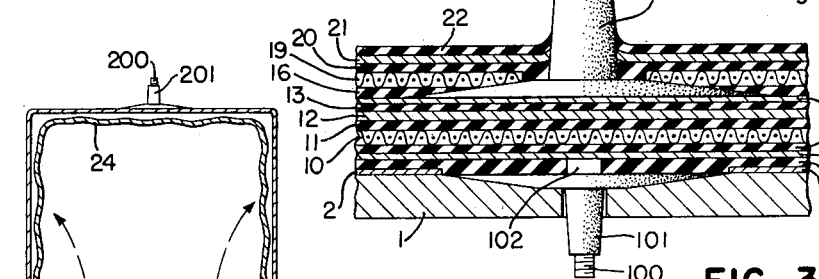
FIG. 3 is an enlarged cross-sectional view of the placement of valves while building the container for the entrance and exit of fluids in the finished container.

Referring to the figures, numeral 1 is a building form such as metal, plastic, wood, paper, plaster or cardboard or a flexible material having the general shape of the container to be prepared. It is usually desired that the building form will not tightly adhere to the flexible polymeric material when deposited upon it. In this description of the figures a flexible polymeric material is deposited by applying liquid polyurethane reaction mixture as spray coats and drying and curing the said spray coats. Usually the building form is coated with a releasing agent 2, such as wax or other well-known materials which will not tightly adhere to the flexible polymeric material. A suitable valve 100 having a valve support 101 is positioned on and through the building form. A plug 102 having a release agent coating can be placed in the valve and then at least one spray coat of a polyurethane reaction mixture 3 is applied over the release agent coating the valve support 101, and around the plug 102 down to numeral 4. The polyurethane reaction mixture coat is then cured to form a first solid flexible polyurethane layer 3 adhered to the valve support 101, and a second release agent coating 5 is applied over the said first cured polyurethane layer and plug 102 down to numeral 6.

A second liquid polyurethane reaction mixture covering 7 is sprayed over the second release agent coating down to numeral 8 and over a part of the first cured polyurethane layer to form a seam 9. The second polyurethane reaction mixture covering is cured to form a second flexible polyurethane layer 7 adhered to the first polyurethane layer at the seam 9. Over the second polyurethane layer is adhered a textile fabric 10 for strengthening purposes, if desired. Various textile fabrics can be used such as those produced from various yarns and those produced from continuous filaments by processes known in the art. Fabrics prepared from polyamides such as nylon, from polyesters, from cellulose and cellulose derivatives such as cotton and rayon, and from wire are particularly useful. Fabrics having various weights can be used such as those having weights of from less than about 0.5 to about 15 ounces per square yard or higher.

If the textile fabric is used, a third liquid polyurethane reaction mixture is spray coated onto the textile fabric and cured to form a third flexible polyurethane layer 11 adhered to the textile fabric layer 10. Over the third polyurethane layer is adhered a layer of a hydrocarbon barrier material 12 to assist in preventing the diffusion of hydrocarbons through the polyurethane, if desired. If the hydrocarbon barrier material is used, a fourth liquid polyurethane reaction mixture may be spray coated onto the barrier material and cured to form a fourth flexible polyurethane layer 13 adhered to the barrier material, thereby forming the first compartment of the container. Over the fourth polyurethane layer is applied a third release agent coat 14 down to numeral 15.

A suitable valve 200 having a valve support 201 is positioned over the third release agent coat. A fifth liquid polyurethane reaction mixture covering 16 is sprayed over the third release agent coat over the valve support 201 down to numeral 17 and over a part of the fourth cured polyurethane layer 13 to form a seam 18. The fifth polyurethane reaction mixture is cured to form a fifth flexible polyurethane layer 16 and adhered to the valve support 201 and to the fourth polyurethane layer at the seam 18. Over the fifth polyurethane layer is adhered a textile fabric 19 for strengthening purposes, if desired. If the textile fabric is used, a sixth liquid polyurethane reaction mixture is spray coated onto the textile fabric and around the valve support 201 and cured to form a sixth flexible polyurethane layer 20 to the textile fabric and to have valve support 201. Over the sixth polyurethane layer and to the valve support 201 is adhered a layer of a hydrocarbon barrier material 21 to assist in preventing the diffusion of hydrocarbons through the polyurethane, if desired. If the hydrocarbon barrier material is used, a seventh liquid polyurethane reaction mixture is spray coated onto the barrier material and around the valve support 201 and cured to form a seventh flexible polyurethane layer 22 adhered to the hydrocarbon barrier material and valve support 201, thereby forming a second compartment of the container.

Figure 4:
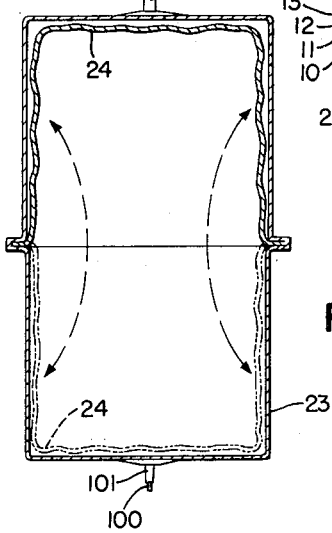
FIG. 4 is a cross-sectional view of an expeller container of the pinched-seam type having an integral diaphragm therein.

The building form is then removed from the prepared container. The valve plug 102 is blown out of the valve 100 with suitable gas pressure, and the container wall 23, comprising the flexible polyurethane layer 3 is moved outward, or turned inside out, with a suitable gas pressure, if desired, thus forming the container shown in cross-section view in FIG. 4 having an integral flexible diaphragm 24 therein which can be used to fill or expell the container with fluids by applying a suitable pressure to a side of the diaphragm to cause its displacement.

It is to be understood that additional fuel barrier layers and additional textile fabric coverings can be applied to the building form, or to the various polyurethane coats, usually before the polyurethane coats are fully cured, and that additional polyurethane reaction mixture coverings can be applied to the various layers and coats and cured.

The various coverings of polyurethane reaction mixture can be dried and cured within a relatively short time, with the application of heat, if desired, usually within about an hour or less, depending upon the nature of the polyurethane reaction mixture and the catalyst utilized.

In the description of the drawings, coverings of a flexible polymeric material are deposited by spraying a liquid polyurethane reaction mixture onto a surface and reacting the polyurethane reaction mixture to set and gel, which is the preferred method. However, it is to be understood in the practice of this invention that containers having at least two compartments are also prepared by depositing coverings of other flexible polymeric materials onto the respective surfaces. Coverings of other flexible polymeric materials can be applied, for example, as suspensions or solutions of flexible plastic and rubber-like polymeric materials to the surfaces and the coagulation and drying of the plastic and rubber-like materials thereon and also by the deposition of molten thermoplastic materials and the cooling and solidifying of the molten materials thereon. In the preparation of the containers of this invention it is preferred to deposit polyurethane reaction mixtures because of ease of handling and their fast reaction time. Although it is preferred that the flexible plastic and rubber-like materials are deposited by spraying, it is to be appreciated that they can be applied by other suitable methods such as by brushing and by dipping. It is an important feature of this invention that multiple compartment containers having complex curved surfaces can be built inside of and around building forms having convex and concave surfaces.

In preparing a pinced seam-type container according to this invention it is usually desired that a sufficient amount of the flexible polymeric material is deposited to provide layers of the flexible material having wall thicknesses of from about 1 to about 50 mils. Each successive coat can be dried or partially dried or cured or at least partially cured before the application of the next coat or covering.

Various suspensions of flexible polymeric materials can be used such as suspensions comprising dispersions and emulsions of rubbery polymers and copolymers and plasticized particulate vinyl resins. Representative examples of the rubbery polymers and copolymers are natural rubber and various synthetic rubbers such as rubbery polymers of conjugated dienes including polychloroprene, the rubbery copolymers of butadiene and styrene which contain a major proportion of butadiene, particularly copolymers of butadiene and styrene of the hot and cold SBR type which contain from about 60 to about 99 percent by weight of butadiene, copolymers of butadiene and acrylonitrile, butyl rubber, which is a polymerization product of a major proportion of a monoolefin, such as butylene, and a minor portion of multi-olefin, such as butadiene and isoprene, rubbery polymers of isoprene, rubbery polymers of 1,3-butadiene, rubbery copolymers of ethylene and propylene and rubbery terpolymers of ethylene, propylene and a minor proportion of a diene. Aqueous emulsions of such rubbery polymers and copolymers are particularly suitable. The suspensions of the rubbery polymers and copolymers can be compounded with suitable vulcanizing materials such as sulfur and with vulcanization accelerators so that they can be cured after their deposition.

Representative plasticized vinyl resins are plasticized polyvinyl chloride and plasticized copolymers of vinyl chloride with another vinyl compound such as vinyl chloride-vinyl acetate copolymers, vinyl chloride-vinyl ether copolymers, vinyl chloride-maleate or fumarate copolymers and vinyl chloride-vinylidene chloride copolymers. The particulate vinyl resins can be plasticized with plasticizers well known to those skilled in the art, applied to the surface and heated to coalesce the resin particles and form a flexible layer.

Suitable polyurethane reaction mixtures for this invention comprise a reactive hydrogen-containing polymeric material and an organic polyisocyanate. It is to be understood that the polyurethanes referred to in this specification may also contain polyurea linkages. Usually a solvent is added to the reaction mixture so that it will be in the form of a fluid mixture or solution. Generally, sufficient solvent is added to form a solution containing from about 40 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 55 percent or higher is generally desired.

The reactive hydrogen-containing polymeric material used comprises at least one member selected from the group consisting of polyester polyols, polyesteramides, polyether polyols, dihydroxy-terminated polymers of conjugated diene hydrocarbons, and castor oil. The reactive hydrogen-containing material generally used as a molecular weight between about 700 and about 5,000 and, usually, between about 1,000 and about 3,000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Polyesteramides may be prepared by reacting a diamine, a glycol, and a dicarboxylic acid under conditions which will remove the water of condensation. Representative glycols and dicarboxylic acids useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyl diamine, phenylene diamine, methylene dianiline, toluidine diamine, dichlorobenzidine, and methylene-bis-chloroaniline.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methyl-one-bis(cyclohexyl-isocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate, are preferred.

The polyurethane polymers of this invention are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amine groups. This prepolymer is then usually dissolved or dispersed in the solvent to form a solution or dispersion which is then mixed with a catalyst, chain extending agent, and/or a cross-linking agent to form a polyurethane reaction mixture.

Other methods known to those skilled in the art of preparing polyurethane reaction mixtures with or without solvents being present may also be used.

A catalyst can be used to facilitate the reaction which results in substantially reduced set-up time, and thus enhances the thiexotropic properties of the polyurethane mixture. Well-known polyurethane catalysts are useful for this purpose such as tertiary amines and the tin salts of fatty acids.

Agents which promote chain extension and cross-linking of the polymer are also useful and are sometimes known as curing agents which facilitate reacting the polyurethane reaction mixture to set and gel. Aromatic diamines, hydrocarbon diols, such as ethylene glycol and propylene glycol, hydroxyl-amines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material. Bifunctional materials such as glycols and diamines are generally preferred as chain extending and crosslinking agents. In general the bifunctional materials yield products having superior spraying properties. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols such as ethylene glycol, 1,3-propane-diol, 1,4-butane-diol and glycerol; aliphatic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-amino-benzyl aniline, and o- and p-aminodiphenylamine; hydroxy amines such as triethanol amine, 2-amino-ethyl alcohol, 2-amino-1-naphthol and m-aminophenyl; hydroxy carboxylic acids such as glycolic acid and alpha-hydroxy propionic acid; and amino carboxylic acids such as amino acetic acid and amino benzoic acid. The preferred crosslinking agents are butane diol and the chloroamines such as ortho-dichlorobenzidine and methylene bis orthochloroaniline. Generally the chain extending or cross-linking agents having acid groups tend to form a cellular polyurethane and thus, form a container having buoyancy.

Any of the nonreactive solvents normally used in making paints which are suitable for spraying are useful for the polyurethane reaction mixtures used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone methyl ethyl ketone, diethyl ketone, methyl isoamyl ketone, cellosolve acetate, cellosolve propylate, cellosolve acetate butyrate, dioxane, lower nitroparaffins, etc. Mixtures of solvents may be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about 1 to 2 parts of pigment per 100 parts of prepolymer by weight. Submicroscopic pyrogenic silica has been found to be an effective thixotropic agent. This material is prepared by the vapor phase hydrolysis of silicon tetrachloride. Such silica, sold under the trademark CAB-O-SIL by Godfrey L. Cabot, Inc., is useful as a thixotropic agent in the sprayable polyurethane compositions when used in about 0.1 to 10 parts by weight per 100 parts of the prepolymer in the solution. The preferred amount is from about 0.5 to about 4 parts by weight. This range of pyrogenic silica gives improved thixotropic properties in the resulting sprayable composition.

Suitable building form surfaces when used for preparing the containers of this invention are surfaces to which the flexible plastic materials do not tightly adhere. Exemplary surfaces are those prepared from materials known to those skilled in the art such as polyethylene and polypropylene. Further exemplary surfaces are those formed by coating the building form with various suitable release agents and parting films also known to those skilled in the art. Representative and suitable release agents are those that do not react with the deposited flexible materials to reduce their flexibility, tear, tensile, strength and cold temperature properties. Some of the many suitable release agents include the polyvinylalcohols. Alternately, the building form can be coated with a polyethylene or polypropylene wax coating and this coating can serve as the release agent. Various other waxes can also be used.

The following examples further illustrate the invention and are not intended to be limiting. In these examples, parts and percentages are by weight unless otherwise indicated.

EXAMPLE I

A two-compartment pinched seam-type container made of polyurethane and having an integral diaphragm therein is prepared by the following method:

A cylindrical metal 50-gallon drum having a diameter of about 22 inches and a height of about 32 inches is coated with a release coat of max (obtained as Johnson's Traffic Wax Paste – a heavy duty polishing wax from The Johnson Company). A coat of a liquid polyurethane reaction mixture is sprayed over the top and the upper half of the side of the release coated drum. The coat of the polyurethane liquid reaction mixture is allowed to dry and cure at about 25° C. for about 4 hours to form a first cured elastomeric polyurethane layer. A second coat of the wax is applied as a release agent over the first polyurethane layer on the top of the drum and over the first polyurethane layer on the side of the drum down to about 1 inch from the edge of the first polyurethane layer on the side of the drum, thereby leaving a 1-inch band of exposed polyurethane around the middle of the side of the drum.

A second coat of the liquid polyurethane reaction mixture is sprayed over the release agent coat on the top half of the drum and the side of the drum to coat both the second release agent coat and the exposed 1-inch band of the first polyurethane layer. The second polyurethane reaction mixture coat is allowed to dry and cure at about 25° C. for about 4 hours to form a second cured elastomeric polyurethane layer adhered to the first polyurethane layer at the 1-inch band around the drum.

A third coat of the wax is applied over the second polyurethane coat on the top of the drum and on the sides of the drum down to about 1 inch from the edge of the second polyurethane layer on the side of the drum, thereby leaving a 1-inch exposed band of the second layer of polyurethane around the middle of the side of the drum.

Over the second wax coat and the exposed 1-inch band of the second cured polyurethane layer is applied a third spray coat of liquid polyurethane reaction mixture. The third spray coat is allowed to dry and cure at about 25° C. for about 4 hours to form an elastomeric cured third polyurethane layer.

The built-up structure is removed from the 50-gallon drum building form. A small hole having a diameter of about ½ inch is cut out of each of the first and third polyurethane layers. The first layer of polyurethane is turned inside out so that the structure assumes the shape of a cylindrical container having a diameter of about 22 inches and a height of about 60 inches, and the second layer of polyurethane becomes an integral diaphragm within the container.

The sprayable polyurethane liquid reaction mixtures as used in this example were prepared from a prepolymer. The prepolymer was used to prepare a black masterbatch by ball milling 1,250 parts of the prepolymers with 375 parts cellosolve acetate, 125 parts carbon black and 375 parts of methyl ethyl ketone. The ball milling was continued until a uniform suspension was obtained.

The sprayable polyurethane liquid reaction mixtures were prepared by mixing together two components just prior to the time the spray coats were to be applied. Component 1 of the spray mixture was formed by mixing 165 parts of the black masterbatch with a mixture consisting of 1,500 parts of prepolymer, 450 cellosolve acetate, 450 parts of methyl ethyl ketone and 72 parts of a solution of cellulose acetate butyrate containing 10 percent by weight of a mixture containing 50 percent xylene and 50 percent methyl cellosolve acetate. Component 2 of the sprayable mixture comprised 153 parts of methylene-bis-ortho-chloroaniline and 153 parts of methyl ethyl ketone.

The following prepolymers are suitable for use in the formation of component 1 of this example:

PREPOLYMER A

A reaction product of 2 mols of tolylene diiosocyanate with about 1 mol of a polyester having a molecular weight of from about 1,000 to about 2,000 formed by condensing an excess of ethylene glycol with adipic acid.

PREPOLYMER B

Same as Prepolymer A except that about 1.1 mols of the diiosocyanate are reacted with the polyester.

PREPOLYMER C

Same as Prepolymer A except propylene glycol was used to produce the polyester instead of ethylene glycol.

PREPOLYMER D

Same as Prepolymer A except methylene diphenylene diisocyanate was used instead of toluene diisocyanate.

PREPOLYMER E

The same as Prepolymer C except methylene diphenylene diisocyanate was used instead of toluene diisocyanate.

PREPOLYMER F

The reaction product of 2 mols of toluene diisocyanate with 1 mol of a polytetramethyleneether glycol having a molecular weight of about 3,000

PREPOLYMER G

The reaction product of 2 mols of toluene diisocyanate with 1 mol of a polyester having a molecular weight of from about 1,000 to about 1,500 prepared by the condensation of adipic acid with an excess of a mixture consisting of 80 percent by weight ethylene glycol and 20 percent by weight propylene glycol.

In this particular example, Prepolymer G is used to prepare a sprayable polyurethane liquid reaction mixture. Also in this particular example the method of this invention for preparing such a container with the application of a liquid polyurethane reaction mixture over a form having a convex surface. The method is further exemplified by preparing such a container in a form having a concave surface, such as the inside surface of the 50-gallon drum with the polyurethane reaction mixture. It is to be understood that additional exemplifications of the method of this invention are made with forms having concave and convex surfaces by depositing thereon coats of (a) aqueous emulsions of 1,3-butadiene-styrene rubbery copolymers where the copolymer comprises from about 50 to about 99 percent by weight of units derived from 1,3-butadiene and where the aqueous emulsion comprises from about 10 to about 60 weight percent of the copolymer and is compounded with a recipe containing a vulcanizing accelerator and sulfur as a vulcanizing agent. The emulsion is dried and cured at a temperature of from about 20° C. to about 200° C. depending upon the accelerator used.

The sprayable polyurethane compositions used in this invention have thus far been described as comprising a prepolymer, a solvent, a crosslinking agent and certain other additive agents. Although the embodiments described previously herein illustrate the best method of accomplishing this invention, those skilled in the art would realize that a sprayable reaction mixture comprising a reactive hydrogen containing polymeric material and an organic diisocyanate in sufficient solvent can be mised and then sprayed, even immediately, if desired, upon the container form. Then in a very short time the spray coat will react to form the prepolymer in situ on the form. Hence, the prepolymer which now forms the coating can be crosslinked by exposure to an atmosphere which contains vapors such as those of water, or with a diamine or glycol to produce a polyurethane composition of a nature simulating that obtained by the previously described embodiments. It is to be appreciated that the use of crosslinking agents having acid groups tend to produce cellular polyurethane structures which can be useful in preparing containers having added buoyancy.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a pinched seam-type flexible container of a cured polyurethane having wall thicknesses of from about 1 to about 50 mils and having at least two compartments therein from a sprayable liquid polyurethane reaction mixture solution comprising the steps of A. forming a first compartment of the container by
      1. spray coating a layer of liquid polyurethane reaction mixture solution on a portion of a surface of a building form and curing the said reaction mixture at a temperature of from about 20° C. to about 150° C. to form a first portion of the said compartment, the said surface of the building form having the property of not tightly adhering to the cured polyurethane;
      2. applying a first release agent coat over at least a part of the first portion of said compartment except the area to be exposed for forming a seam between said first portion and the next formed portion;
      3. spray coating a second layer of liquid polyurethane reaction mixture solution over at least a part of the first release agent coat and at least a part of the said exposed area of the first portion of the said compartment and curing the said reaction mixture at a temperature of from about 20° C. to about 150° C. to form a seam between the first and second portions of said compartment to thereby define a compartment of the said container having walls of the cured polyurethane;
   B. forming at least one successive compartment of the container by the method comprising the steps of 1. applying a release agent coat over at least a portion of the prior-formed compartment except the area to be exposed for forming a seam between the said portion of the prior-formed compartment and the next formed portion of the successive compartment;
2. spray coating a layer of liquid polyurethane reaction mixture solution over at least a part of the exposed release agent coat and at least a part of the said exposed area of the portion of the prior-formed compartment and curing the said reaction mixture at a temperature of from about 20° C. to about 150° C. to form a seam between the prior-formed compartment and the next formed portion of the successive compartment of the said container having walls of the cured polyurethane:

wherein the said polyurethane reaction mixture is prepared from

A. a reactive hydrogen-containing polymeric material having a molecular weight between about 700 and about 5,000 selected from the group consisting of polyester polyols, polyester amides, polyether polyols, dihydroxyl-terminated polymers of conjugated diene hydrocarbons, and caster oil, B. an organic diisocyanate wherein the overall molar ratio of the isocyanate groups of the diisocyanate to the reactive hydrogens of the hydrogen-containing polymeric material is from about 1.1/1 to about 12/1, and C. at least one compound selected from bifunctional reactants consisting of glycols, diamines having primary amino groups, diamines having secondary amino groups, dicarboxylic acids, hydroxy amines, hydroxycarboxylic acids, and amino carboxylic acids, in a ratio of from about 0.5/1 to about 1.5/1 of the amine, hydroxyl, and acid groups to the isocyanato groups in excess of the reactive hydrogens of the reactive hydrogen-containing polymeric material.

2. The method according to claim 1 where the building form is cardboard.

3. The method of claim 1 where the said liquid polyurethane reaction mixture solution comprises a diamine and a prepolymer of the organic diisocyanate and at least one of the reactive hydrogen-containing polymeric materials selected from polyester polyols, polyether polyols and dihydroxyl-terminated polymers of conjugated diene hydrocarbons.

* * * * *